March 22, 1966     V. J. SOOJIAN     3,241,625
MATERIAL FEEDING
Filed July 24, 1963
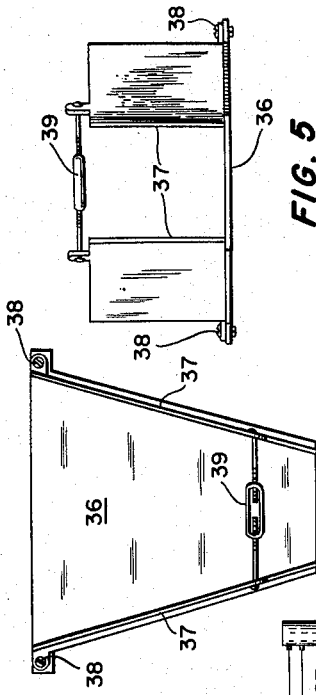
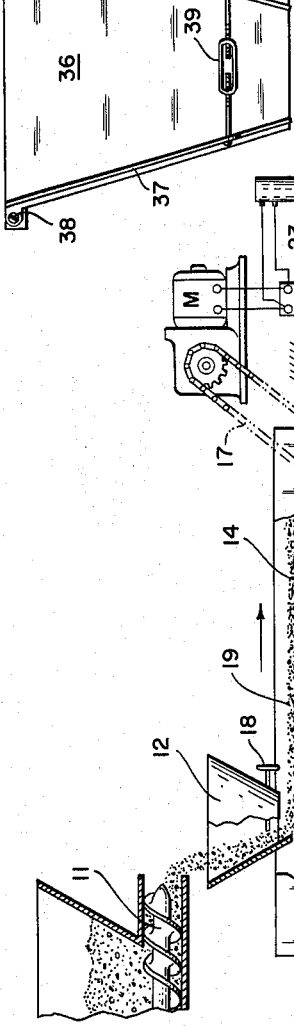
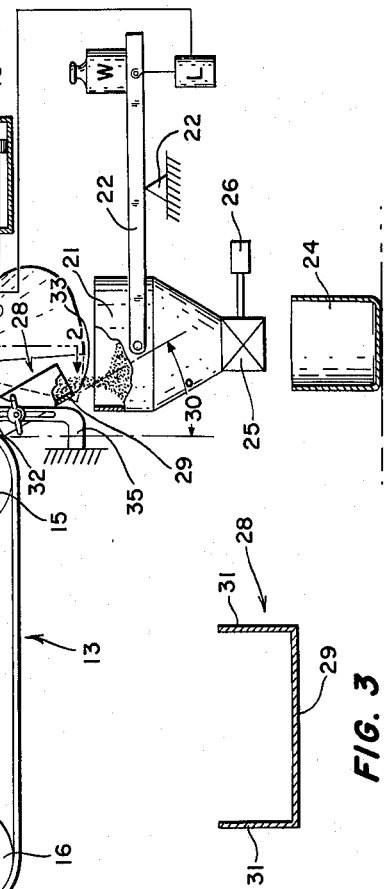
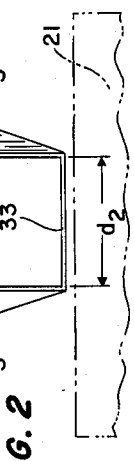
INVENTOR
VAHN J. SOOJIAN
BY *Norris & Bateman*
ATTORNEYS

United States Patent Office 3,241,625
Patented Mar. 22, 1966

3,241,625
MATERIAL FEEDING
Vahn J. Soojian, Pompton Lakes, N.J., assignor to Howe Richardson Scale Company, Clifton, N.J., a corporation of Delaware
Filed July 24, 1963, Ser. No. 297,265
4 Claims. (Cl. 177—120)

This invention relates to the feeding and weighing of fluent relatively dry bulk material such as granular and powdered materials, hereinafter referred to as particulate material, and particularly to special feed stream modifying arrangements and methods whereby pulsations and like variations in the feed stream arising from belt and other conventional material feed devices delivering the material to the weigh hopper are substantially eliminated so that weighing accuracy is greatly increased and the entire weighing operation is speeded up, thereby rendering the invention particularly adaptable to automatic weighing apparatus.

It has been known that conventional continuous feed of granular and like material into a weigh hopper is subject to inaccuracies due to flow variations in the material feed stream that produce unpredictable impact forces and result in random weighing indications in the weigh system. For example, in the belt feeding of a material such as mash even uniformly flowing material will break up into chunks as it drops off the discharge end of the belt into the weigh hopper, thereby producing a series of impacts that register at random in the weighing mechanism and result in poor weighing accuracy.

Dribble feed at the end of predetermined weigh cycles has been proposed and is used, but this is expensive requiring complex controls and auxiliary apparatus and it slows up the overall weighing operation. Expedients tending to smooth flow of the material stream have been tried, such as interposing grids and either horizontal or vertical wires or bars in the feed stream at the discharge end of the belt but, while some of these expedients may have reduced the impact forces considerably they did not solve the problem.

Weighing apparatus incorporating other conventional feeders, such as worm and rotating paddle feeders, have encountered the same reduction in weighing accuracy for essentially the same reason. In all of them pulsations in the material feed stream discharged from the feeder into the weigh hopper produce the undesirable impact forces on the weighing system.

The present invention solves the problem by interposing a flow filter channel between the discharge end of the feeder and the weigh hopper, of such characteristics as to eliminate the pulsations in the material feed stream and thereby prevent such impact forces from acting on the weighing system.

It has been discovered in the invention that if the flow of material becomes steady before reaching the weigh hopper these objectionable pulsations are eliminated and there is substantially no variation in impact force of the material stream on the weigh hopper. The flow filter channel of the invention steadies the flow of material received from the feeder, and it can be used with any conventional feeder so that no expensive complex apparatus or controls need be furnished.

By steady flow of the material is meant that the flow characteristics at any fixed point along the stream do not change with time. Steady flow is not to be confused with uniform flow which means that velocity, cross-section and like flow parameters do not change from point to point along the flow path. In non-uniform flow the flow parameters may change from point to point along the flow path. Steady flow can and does exist whether the flow is uniform or non-uniform.

In practicing the invention it has been found that, by allowing the material discharged by the power driven feeder to drop onto and flow down a downwardly inclined static plate having sides converging in the direction of flow, the stream discharged into the weigh hopper is free of impact producing pulsations. The inclination of the plate and the degree of convergence of the sides may be selected or adjusted to suit different materials.

It is therefore the major object of this invention to provide in a weighing system of the type wherein bulk particulate material is fed into a weigh hopper by a power driven feeder a novel method and apparatus whereby the feed stream discharged by the feeder acquires a steady flow state prior to entry into the weigh hopper.

A further object of the invention is to provide in a weighing apparatus of the type wherein a power driven feeder, such as a belt feeder, discharges directly into a weigh hopper, novel means introduced between the discharge end of the feeder and the weigh hopper for steadying the state of flow of the stream.

Another object of the invention is to provide in a weighing apparatus of the type wherein a power driven feeder discharges particulate material into a weigh hopper an inclined flow filter channel wherein the stream discharged from the feeder assumes a steady flow state. Pursuant to this object the channel may be an inclined plate having upstanding side walls converging in the direction of material flow, and provision may be made for adjusting the entire channel as to inclination or location relative to the feeder.

Further objects of the invention will appear as the description proceeds in connection with the appended claims and the annexed drawings wherein:

FIGURE 1 is a relatively diagrammatic view in side elevation showing the invention in a preferred embodiment;

FIGURE 2 is a front elevation showing the flow filter channel at the discharge end of the material feeder;

FIGURE 3 is a section on line 3—3 of FIGURE 2;

FIGURE 4 is a top plan view of a flow filter channel having adjustable sides; and FIGURE 5 is a front elevation of the channel of FIGURE 4.

In its preferred embodiment the invention will be described as employed in automatic weighing apparatus wherein the particulate material is mash such as used for feeding poultry, and the material feeder is a continuously driven endless belt that discharges the material toward an opening in the upper end of a weigh hopper. It will be appreciated that the invention is applicable to weighing apparatus employing a gravity feed as well.

The particulate matter is supplied as by a screw feeding device 11 in sufficient quantity to maintain substantially filled a supply hopper 12. The bottom of hopper 12 is open to discharge the material in a layer upon an endless belt power driven feeder 13 of conventional construction. Feeder 13 has its upper flight 14 horizontal and moving from left to right in FIGURE 1 between pulleys 16 and 15 which are driven at the same constant speed by an electric motor drive connected by chain 17 to head pulley 15. If necessary a sprocket and chain connection (not shown) may be provided between the pulleys. An adjustable gate 18 regulates the height of the level of particulate material on the upper belt flight 14 and thereby may be adjusted to regulate the volume of material advanced by the feeder 13.

The material advanced by feeder 13 is indicated in layer 19 on the horizontal flight 14 of the belt, and this layer of material in conventional weighing installations usually falls off the belt passing over the head pulley 15 directly into the weigh hopper 21. Hopper 21 is shown diagrammatically as suspended on one end of a beam 22 fulcrumed at 22' and carrying a balancing weight system indicated at W. A strain sensitive device such as a load cell L is connected to measure beam displacement and therefore the weight at hopper 21, and the electrical output of cell L is connected into a motor control device 23, whereby when a predetermined weight is attained in hopper 21 the load cell L sends a signal to control 23 to stop motor M and automatically arrest feeding of the material into the weight hopper. Then the contents of weigh hopper hopper 21 may discharged into a bag or the like 24 through a valve 25 actuated by a manual control 26.

The foregoing is more or less conventional in automatic weighing and may be provided with the usual refinements known in the art, and the invention is applicable to all of them. For example the invention may be applied to the weigh hopper feeders and systems disclosed in Richardson Patent No. 2,564,544 issued August 14, 1951, and Klein et al. Patent No. 2,793,000 issued May 21, 1957.

Referring now to FIGURES 1–3, the invention comprises the provision of a flow filter channel 28, preferably formed from a single sheet of metal, interposed in the flow path between the discharge end of feeder 13 and the weigh hopper 21. Channel 28 comprises a flat bottom wall 29 which in the assembly is disposed at an acute angle relative to the horizontal and straight side walls 31 upstanding from bottom wall 29 and converging in the direction of material flow. Side walls 31 may be formed by upwardly bending the side edges of the sheet metal bottom wall 29, and the channel cross-section is preferably substantially rectangular as shown in FIGURE 3.

As shown in FIGURE 1, channel 28 is static, being fixedly mounted so that the upper edge 32 of wall 29 is disposed below that part of the belt which extends over head pulley 15, so that all of the particulate material coming down from the feeder 13 will fall on the upper regions of bottom wall 29 of the flow channel and slide down the wall 29, and wall 29 extends downwardly and forwardly in the flow direction at a rather steep angle to dispose its forward edge 33 over the open top of weigh hopper 21.

The angularity of wall 29 in the preferred embodiment is about sixty degrees to the horizontal. For a feeder belt about eight inches wide, the channel walls diverged from about ten inches apart ($d_1$) at upper edge 32 to about four inches apart ($d_2$) at discharge edge 33. The depth of side walls 31 is not material but must of course be sufficient to contain the flowing stream of material. About five inches in depth has been found adequate. The channel is open at its top. The longitudinal dimension of the channel may be relatively short, but it must be sufficient to provide for sliding flow of the material on bottom wall 29 and enable the establishment of steady flow at the discharge end over the weigh hopper. In the preferred embodiment wall 29 is about eleven inches long.

The angle of inclinatioin of wall 29 may change in its plane which is parallel to the direction of flow of the material, and both the angle of inclination and the location of the channel below the discharge end of the feeder 13 may be varied as by the slot and wing nut and bolt assembly 34 that secures the channel on support 35. Once this adjustment is made to suit the material being handled, the channel remains fixed for the job. In general this angularity may be varied to suit different materials, but preferably it does not fall below about 45° nor does it seem practical to incline it above 75°.

The divergence of side walls 31 also may be varied somewhat dependent upon the material being handled. In the preferred embodiment wherein the side walls 31 diverged from ten inches to about four inches apart the angle included by them was about thirty degrees. The angularity should be sufficient to locate the apex of conversion of the stream at least a few inches beyond lower edge 33.

During operation, particulate material is advanced at constant speed in a uniform height layer 19 along the top flight 14 of the belt feeder 13. As the material passes over head pulley 15 and starts downwardly it separates into chunks or bodies which fall irregularly. Especially where the material may be slightly moist or sticky these bodies appear as pie segment shapes of varying size as they drop off the belt. This chunking is the result of acceleration of the material starting to fall and gradient variations outwardly of the belt. If these bodies were allowed to fall directly into hopper 21 such would produce the undesirable impact conditions of the prior art. These bodies in the invention fall onto the upper widest region of bottom wall 29 and collapse upon themselves or spread out as the material strikes, and then the material slides down wall 29 by gravity toward the restricted outlet at edge 33. During this travel along wall 29 the side walls 31 confine and converge the moving fluent stream of particulate material which assumes a steady flow state free of pulsations and like variations by the time it passes over edge 33.

The convergence of the stream near the exit mouth of the channel usually results in increased velocity and, far from being adverse, this circumstance appears to aid and enhance steady state flow.

Once the material has reached weigh hopper 21, the sequence of weighing and filling is the same as in conventional apparatus, but the whole system is greatly speeded up in operation because the weighing indications are now so smooth and free from fluctuations due to stream impact forces that overall control is improved. Accuracy over prior installations wherein the feeder discharged directly into the hopper is unexpectedly increased, being about ten times more advantageous.

The internal material contacting surfaces of channel 28 are preferably smooth and may be polished. The channel may be fabricated from a suitably bent sheet of stainless steel. For reducing wear and corrosion in some installations the material contacting surfaces of the channel may be coated with a layer of hard smooth plastic such as polytetrafluoroethylene, polyethylene, nylon or the equivalent. The anti-sticking properties of such plastics, and particularly Teflon, makes them suitable linings for sticky materials such as dairy feed which is wet with molasses.

Preferably, a pivotally mounted cut-off gate 42 interposed between the discharge end of channel 28 and weigh hopper 21 is swingable about its axis from the position shown in solid lines to the position shown in dotted lines to effectuate immediate interruption of material flow into the hopper. Gate 42 is actuated by a suitable fluid motor 43, and supply and exhaust of motor operating fluid, such as pressurized air, is controlled by a solenoid operated valve 44. The solenoid operator of valve 44 is electrically connected in parallel with motor M so that the electrical balance signal stopping motor M will actuate valve 44 to supply operating fluid for causing motor 43 to swing gate 42 to its cut-off position. This assures immediate cut-off of the falling column of material between channel 28 and hopper 21 at the moment the balance signal is transmitted to stop motor M. As a result, continued flow of material resulting from sluff off at the discharge end of feeder 13 or from feeder 13 coasting to a stop will not enter hopper 21 to impair the accuracy of the weighment.

FIGURES 4 and 5 show an embodiment wherein the divergence of the channel side walls may be adjusted to suit conditions. The channel here comprises a bottom plate 36 and upright side walls 37 pivoted at 38. A turnbuckle screw or like adjustment 39 spaces the other ends of the side walls, being located well above the material level in the channel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Weighing apparatus comprising in combination, a counterweighted, fulcrumed weigh beam assembly having a weigh hopper operatively connected thereto for receiving material to be weighed in a continuous falling stream to said weight hopper, gate means displaceable to intercept said falling stream for cutting off delivery of material to said hopper, means responsive to displacement of said weigh beam assembly to a balanced position for displacing said gate means to intercept said falling stream, and means disposed between the discharge end of said feed means and the region where said gate means intercepts said falling stream for providing a substantially steady state of flow of material into said hopper consisting essentially of a fixed position channel having a bottom wall disposed below the discharge end of said feeder means to receive material descending in said falling stream and being inclined at an angle lying between about 45 degrees and 75 degrees with respect to the stream of material descending vertically from the discharge end of said feeder means to discharge material directly into said hopper, said material flowing down said bottom wall solely under the influence of gravity, and side walls forming a part of said channel and extending upwardly from said bottom wall, said side walls confining the flowing stream and converging in the direction of material flow along said bottom wall.

2. The weighing apparatus defined in claim 1 wherein said angle of inclination of the bottom wall is about sixty degrees.

3. The weighing apparatus defined in claim 2 wherein said side walls converge with an angle of about thirty degrees between them.

4. The invention recited in claim 1 wherein said channel is integrally formed from a sheet of stainless steel.

References Cited by the Examiner
UNITED STATES PATENTS

| | | | |
|---|---|---|---|
| 499,223 | 6/1893 | Gorringe | 177—120 |
| 585,233 | 6/1897 | Scott | 177—119 |
| 2,077,152 | 4/1937 | Nowak | 177—122 X |
| 2,191,711 | 2/1940 | Godat | 177—122 X |
| 2,380,733 | 7/1945 | Durning | 177—119 |
| 2,402,217 | 6/1946 | Vredenburg | 177—120 |
| 2,564,544 | 8/1951 | Richardson | 177—72 |
| 2,661,876 | 12/1953 | Kindseth | 177—116 X |
| 2,812,151 | 11/1957 | Mosher | 177—119 |

FOREIGN PATENTS

| | | |
|---|---|---|
| 531,434 | 8/1931 | Germany. |
| 91,118 | 6/1959 | Netherlands. |

LEO SMILOW, *Primary Examiner.*